United States Patent [19]

Piereder

[11] 4,417,434

[45] Nov. 29, 1983

[54] METHODS AND APPARATUS FOR PRODUCING ENCASED MEAT AND MEAT FOR ENCASING

[76] Inventor: Ludwig Piereder, 153 Windmill Crescent, Pointe Claire, Quebec, Canada, H9R 4Y6

[21] Appl. No.: 314,991

[22] Filed: Oct. 26, 1981

[51] Int. Cl.³ ............................................. A22C 11/06
[52] U.S. Cl. .......................................... 53/469; 17/39; 17/49; 53/122; 53/517; 53/521; 53/435
[58] Field of Search .................... 17/49, 33, 34, 41, 42, 17/35, 39; 53/122, 576, 567, 517, 521, 266 R, 469, 435, 434

[56] References Cited

U.S. PATENT DOCUMENTS 2,555,584  6/1951  Fairbank ........................... 53/469 X
3,061,345 10/1962  Hawley ............................. 53/122 X
4,023,238  5/1977  Phares ............................. 53/576 X Primary Examiner—Willie G. Abercrombie
Attorney, Agent, or Firm—Alan Swabey; Robert Mitchell; Guy Houle

[57] ABSTRACT

Methods and apparatus for producing encased meat or the like and meat or the like for encasing, one of the methods disclosed comprises the steps of: conveying the meat or the like along a linear path and maintaining the linear path from a first point where the meat is dispensed from a stuffer or the like to a second point where the meat is in a form for encasing. The apparatus also serves as a portioner for providing uniform portions of the meat or the like being handled, the apparatus further including adjustment means for controlling the length of the portions produced.

19 Claims, 12 Drawing Figures

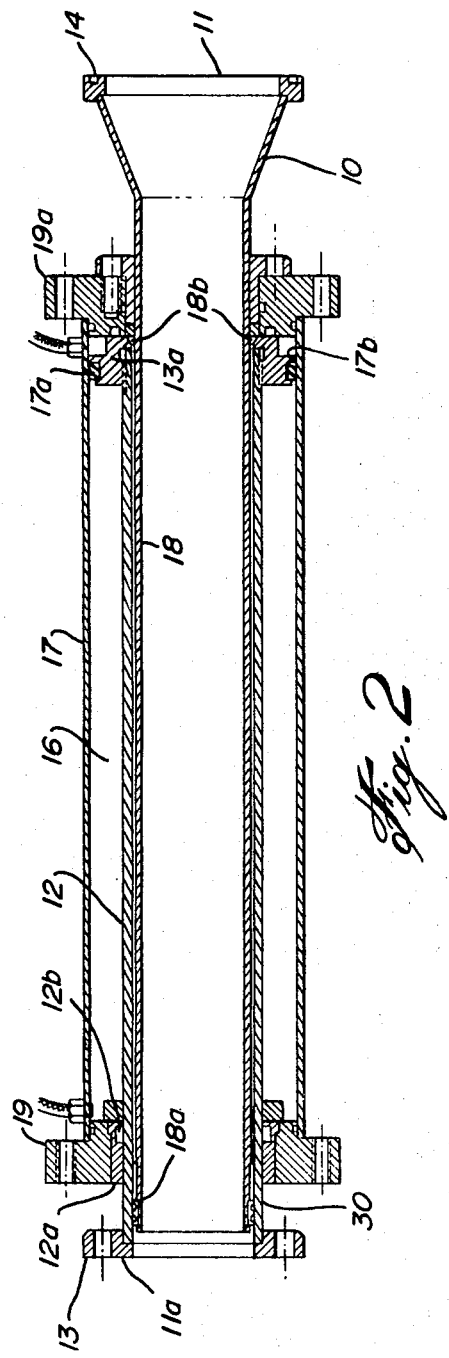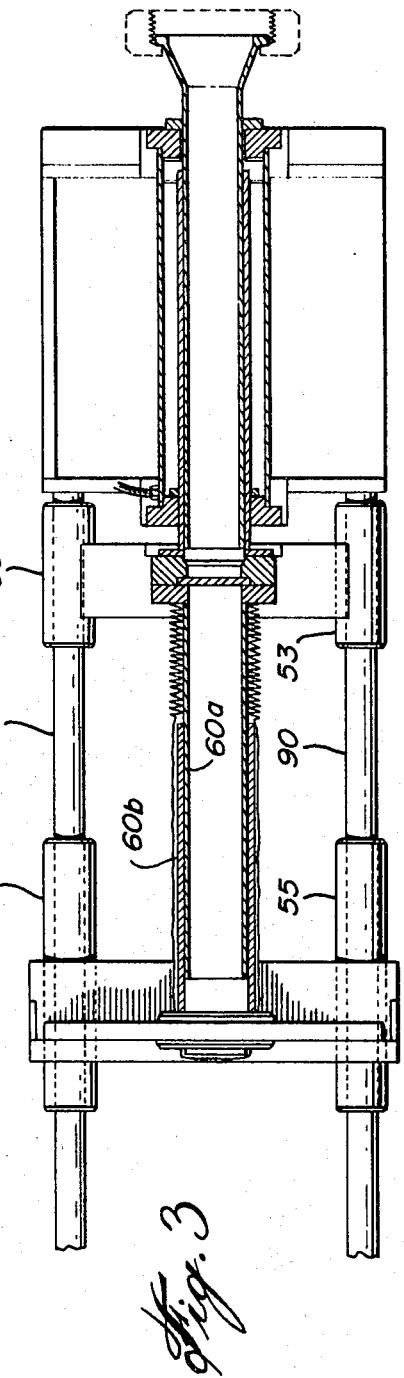

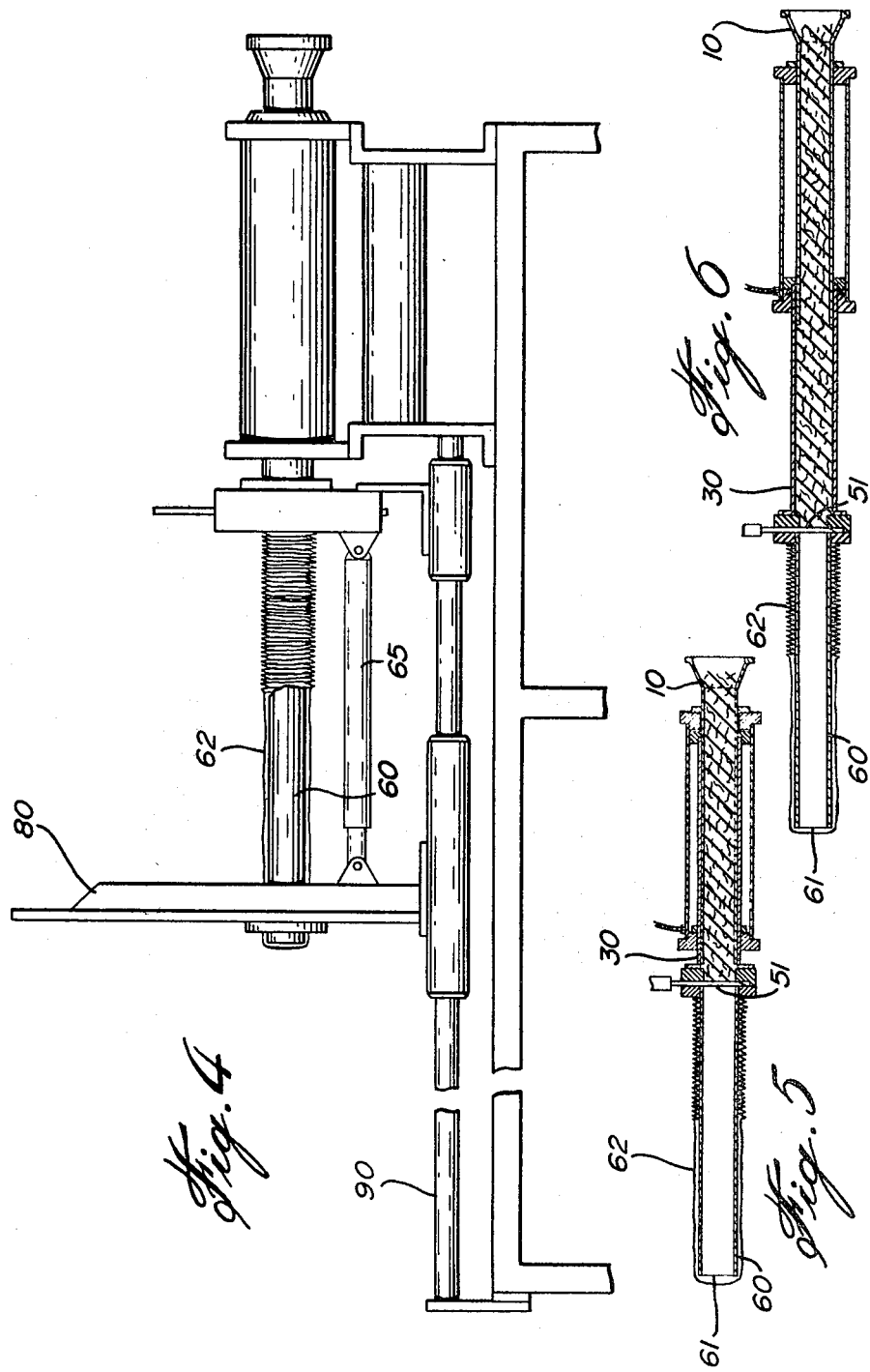

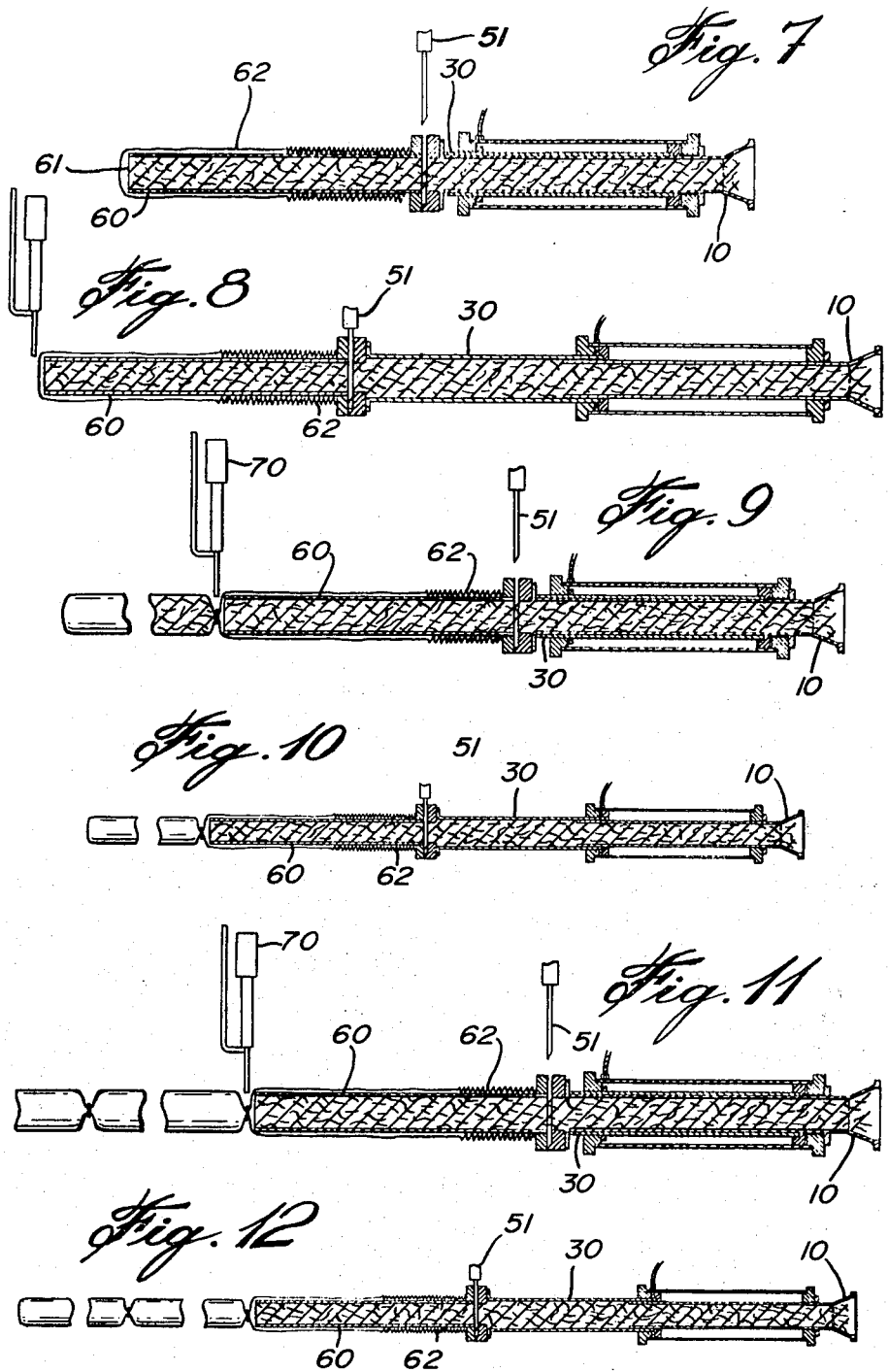

METHODS AND APPARATUS FOR PRODUCING ENCASED MEAT AND MEAT FOR ENCASING

BACKGROUND OF INVENTION (a) Field of the Invention

This invention relates to apparatus for producing encased meats or the like also to methods of producing encased meats or the like. Further, to method and apparatus for producing meat or the like in a form for, for example, encasing. Further, to a portioner for providing uniform portions, of for example meat, of selected length.

(b) Description of Prior Art

Various apparatus is known for use in producing encased meats, however the known apparatus had not been found suitable for handling all types of meat including meats of the solid type such as for example that known as pork butt, ham, poultry and beef. A prime reason for the known apparatus not being suitable for handling such meats is that they direct the meat to be encased from a meat dispenser i.e. stuffer, along a non-linear path and which results in breakage and thus damage to the meat to be encased.

An example of a prior art stuffer suitable for use with the apparatus according to the present invention is shown in Applicant's U.S. Pat. No. 4,060,349 dated Nov. 29, 1977.

A further drawback in respect of the prior art apparatus for producing encased meats is the lack of clean cut provided thereby, i.e. when severing meat portions to be encased. A clean cut is important since it separates portions cleanly and aids crimping of the casings. Further drawbacks in respect of the prior art apparatus include the fact that two cuts are required to be made during the encasing operations and the cuts are not protected. An example of such prior art apparatus is shown in U.S. Pat. No. 4,188,767 dated Feb. 19, 1980.

SUMMARY OF THE INVENTION

It is a prime objection of the present invention to provide an apparatus which overcomes the drawbacks and disadvantages mentioned above. Also, to provide improved methods of producing encased meats and improved methods for producing meat in a form, for, for example, encasing. Further, to provide an efficient portioner, as discussed above.

In accordance with one aspect of the present invention, there is provided an apparatus for producing encased meat or the like comprising in combination: a first elongated linear tubular member adapted to receive therein via a first end thereof, meat fed thereto under pressure, a second elongated linear tubular member mounted for reciprocal linear movement telescopically of said first member, said first member being fixedly mounted to a frame, selectively openable closure means comprising knife means adjacent the end of said second member remote from said first end, for retaining the meat received within said second member, said second member adapted to move under the force of meat fed to meat in said first member whereby to cause said second member to move outwardly in a first direction in telescoping fashion, of said first member, means for moving said second member in a second and opposite direction thereto, a third elongated linear tubular member secured for movement with said second member and adapted to receive, upon opening of said closure means, meat from said second member, said third member extending in a direction away from said second member and having an open end remote from said closure means through which the meat therein is discharged, upon telescopic movement of said second member of said first member in said second direction, said discharged meat being encased by a casing, carried on and dispensed from said third member as it moves toward said first member and crimping means for use in closing said casing on said discharged meat subsequent to severing of said discharged meat by said knife means.

In accordance with a further aspect of the present invention, there is provided an apparatus for producing meat or the like in a form for, for example, encasing, comprising in combination: a first elongated linear tubular member adapted to receive therein via a first end thereof meat fed thereto under pressure, a second elongated linear tubular member mounted for reciprocal linear movement telescopically of said first member, said first member being fixedly mounted to a frame, selectively openable closure means comprising knife means, adjacent the end of said second member remote from said first end, for retaining the meat received within said second member, said second member adapted to move under the force of meat fed to meat in said first member whereby to cause said second member to move outwardly in a first direction in telescoping fashion, of said first member, means for moving said second member in a second and opposite direction thereto, a third elongated linear tubular member secured for movement with said second member and adapted to receive, upon opening of said closure means, meat from said second member, said third member extending in a direction away from said first member and having an open end remote from said closure means through which meat therein is discharged, upon telescopic movement of said second member of said first member in said second direction.

In accordance with a still further aspect of the present invention, there is provided a method of producing encased meat or the like comprising the steps of: (1) feeding meat to be encased under pressure to a first chamber; (2) continuing to feed meat thereto, under pressure, whereby it applies a force to said fed meat, sufficiently to move a second chamber in a first linear direction telescopically of said first chamber, thereby substantially filling up said first and second chambers with meat; (3) opening said second chamber to permit discharge of the meat therefrom to a third chamber; (4) discharging said meat from said second chamber to said third chamber by moving said second chamber in a second and opposite linear direction to said first linear direction; (5) severing the fed meat at a point intermediate said second and third chambers and reclosing said second chamber; (6) feeding further meat to be encased under pressure to said first chamber whereby it applies a force to said fed meat, sufficiently to again move said second chamber telescopically of said first chamber, substantially filling up with meat said first and second chambers; (7) re-opening said second chamber to permit discharge of the meat therefrom into a casing; (8) discharging said meat from said second chamber into said casing by moving said second chamber in said second and opposite direction; and (9) crimping said casing to close said casing over said severed and discharged meat.

In accordance with a still further aspect of the present invention, there is provided a method of portioning meat comprising the steps of: (1) feeding meat to be encased under pressure to a first chamber; (2) continuing to feed meat thereto, under pressure, whereby it applies a force to said fed meat, sufficiently to move a second chamber in a first linear direction telescopically of said first chamber, thereby substantially filling up said first and second chambers with meat; (3) opening said second chamber to permit discharge of the meat therefrom to a third chamber; (4) discharging said meat from said second chamber to said third chamber by moving said second chamber in a second and opposite linear direction to said first linear direction; (5) severing the fed meat at a point intermediate said second and third chambers and reclosing said second chamber; (6) feeding further meat to be encased under pressure to said first chamber whereby it applies a force to said fed meat, sufficiently to again move said second chamber telescopically of said first chamber, substantially filling up with meat said first and second chambers; (7) reopening said second chamber to permit discharge of the meat therefrom into a casing; and (8) discharging said portioned meat from said second chamber by moving said second chamber in said second and opposite direction.

In accordance with a still further aspect of the present invention, there is provided a method of producing encased meat or the like, comprising the steps of: conveying meat to be encased along a linear path and maintaining said linear path from a first point where said meat is dispensed from a stuffer or the like to a second point where said meat is encased.

In accordance with a still further aspect of the present invention, there is provided a method of producing meat or the like in a form for, for example, encasing, comprising the steps of: conveying the meat or the like along a linear path and maintaining said linear path from a first point where said meat is dispensed from a stuffer or the like to a second point where said meat is in said form for encasing.

BRIEF DESCRIPTION OF DRAWINGS

The invention is illustrated by way of example in the accompanying drawings wherein:

FIG. 2 is a sectional view of part of the apparatus shown in FIG. 1;

FIG. 3 is a part sectional plan view of part of the apparatus shown in FIG. 1;

FIG. 4 is a side elevational view of the apparatus shown in FIG. 3; and

FIGS. 5-12 inclusive illustrate diagrammatically the operation of the apparatus according to the invention.

DESCRIPTION OF PREFERRED EMBODIMENTS

Figure 1:
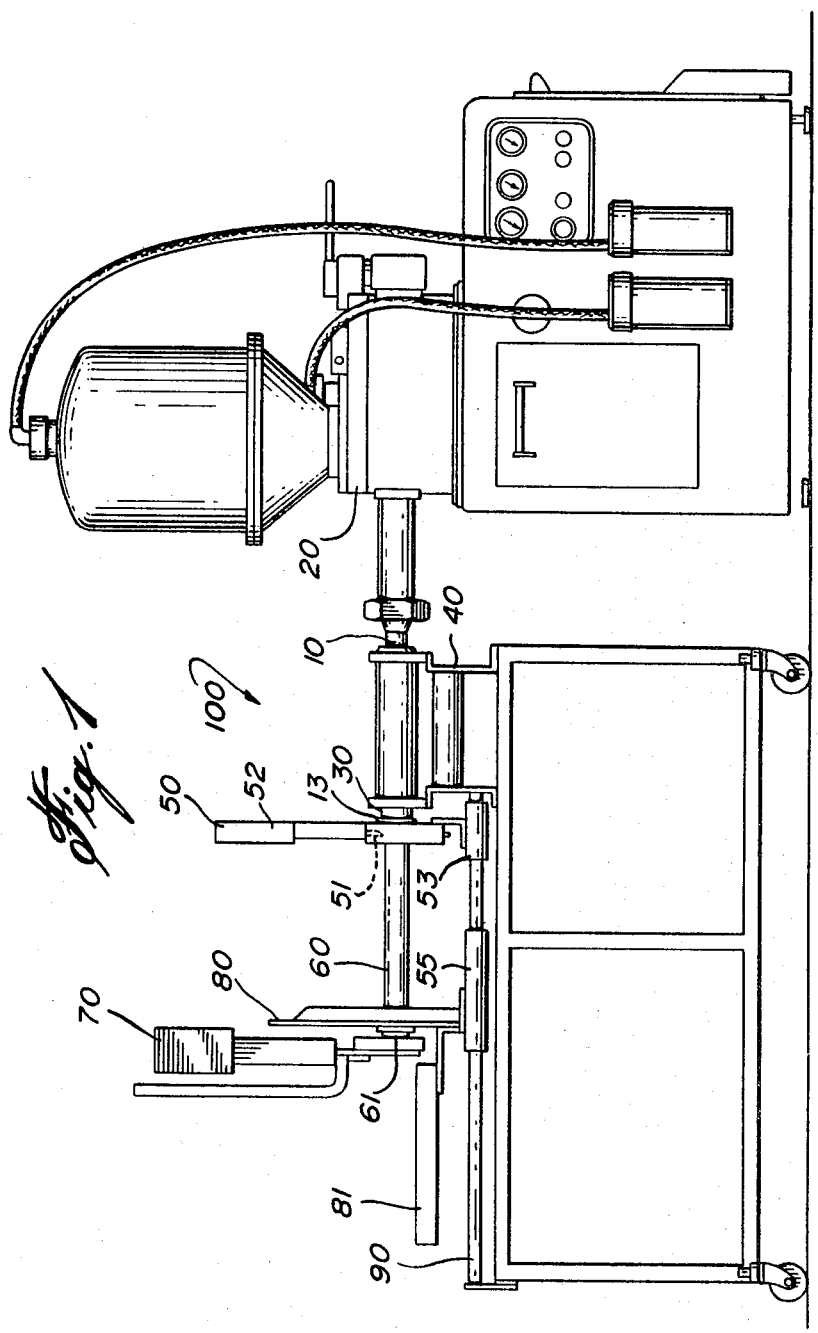
FIG. 1 is a side elevational view of an apparatus in accordance with the present invention including a meat stuffer for feeding meat thereto under pressure.

Referring now in detail to the drawings and which disclose a preferred embodiment of the invention.

FIG. 1 discloses an apparatus 100 for producing encased meat comprising a first elongated linear tubular member 10, clearly seen in FIG. 2, adapted to receive therein via a first end 11, meat fed thereto under pressure from a meat stuffer 20. A second elongated tubular member 30 is mounted for reciprocal linear movement telescopically of member 10 which is fixedly mounted to frame 40. A selectively openable closure means 50 comprising a knife 51 is mounted at end 11a of member 30, for retaining meat received therein. Member 30, is adapted to move, under the force of meat fed to meat in member 10, the force being transmitted through the meat in member 10 to cause movement of member 30 outwardly of member 10 in telescoping fashion. A third elongated linear tubular member 60 is secured for movement with member 30 and is adapted to receive, upon opening of closure means 50, meat from member 30, member 60 having an open end 61 through which the meat therein is discharged upon telescoping movement of member 30 of member 10. The discharged meat is thus rendered in a form for encasing and may be encased by a casing 62 carried on member 60 and dispensed therefrom during retractional movement of member 30 of member 10, carrying member 60 therealong during the retraction movement. Casing 62 is shown diagrammatically in FIG. 5 and others.

A crimping means 70 may be provided as seen in FIG. 1 for use in closing the casing 62 on the discharged meat, following severing of the discharged meat by knife 51.

Referring now in more detail to the apparatus. Member 30, as seen in FIG. 2, like members 10 and 60, for purposes of convenience of design, is cylindrical in shape. Other suitable shapes of course may be used. Member 30 thus comprises a tubular member 12 having a first terminal flange 13 for mounting thereto closure means 50 and a second terminal flange 13a. As further seen from FIG. 2, member 30 is mounted for telescoping movement of member 10, which is rigidly mounted to frame 40. Flange 14 is provided on member 10 for connecting stuffer 20 thereto. Suitable sealing means is provided to create a working air chamber 16, the purpose of which will be discussed hereinafter. Member 10 comprises tubular members 17 and 18, member 17 being secured upon end flanges 19 and 19a and member 18 being secured to flange 19a and indirectly supported upon flange 19. Suitable seals 12b and 17a and bearings 12a, 17b, 18a and 18b are provided between members 10 and 30 enabling smooth telescopic movement and sealing of working air chamber 16.

Meat stuffer 20 may be of any suitable design including for example of the type disclosed in Applicant's U.S. Pat. No. 4,060,349 dated Nov. 29, 1977 and secured by suitable means to flange 14 as shown in FIG. 1.

As indicated previously, member 10 is rigidly secured to frame 40, which as seen in FIG. 1, comprises a mobile arrangement. Frame 40 further includes, as clearly seen in FIGS. 1 and 3, a pair of rail members 90 for movably mounting closure means 50 and frame 80 providing support of member 60 adjacent end 61 thereof. It is visualized a single rail member located centrally of frame 40 may also be used in place of the pair of rail members 90.

Closure means 50, comprising knife 51, is secured by bolting to member 30 at end 11a via flange 13. Closure means 50 further comprises a frame 52 for reciprocal mounting of knife 51 which operates in a guillotine fashion and is moved reciprocally within frame 52 by suitable controlled motor means (not shown). Further, knife 51 is adapted for closing off end 11a of member 10 as well as severing meat placed thereunder. The lower end of frame 52 is secured to a pair of sleeve members 53, best seen in FIG. 3, adapted for sliding movement along rail members 90 upon reciprocal movement of member 30 of member 10 thus to thereby provide reciprocal mounting movement for frame 52.

Third elongated linear tubular member 60 is secured by suitable means such as bolting to frame 52 and supported at its free end via frame 80 to a pair of sleeve members 55 adapted for sliding movement along rail members 90. Secured to frame 80 and adapted to move therewith is a support 81 for receiving meat dispensed from the open end 61 of member 60, or alternatively encased meat dispensed from member 60. As seen in FIG. 3, member 60 may comprise a pair of telescoping portions 60a and 60b. Such affords adjustment of the volume of member 60 and which controls the volume of meat discharged therefrom into the casing. Adjustment means is also provided (not shown) for adjusting the stroke of the reciprocating movement of the apparatus.

Member 60 further includes means for carrying and dispensing a casing or casings for the meat dispensed therefrom and such is shown diagrammatically in FIG. 5 and others. Such includes a brake mechanism (not shown) for controlling the pay-out of the casing during movement of member 60 toward member 10. Such brake mechanism may be of any suitable known type including ones well familiar to those skilled in the art to which the present invention is directed.

As seen in FIG. 4 and omitted from FIG. 1 for reasons of clarity, a positioning means 65 is provided, and comprises a cylinder 65a suitably powered and controlled by means (not shown). Positioner means 65 is pivotally interconnected between frame 80 and frame 52 directly below member 60. Extension of cylinder 65a pushes frame 80 away from end 61 of member 60, to permit installation of casing 62. Cylinder 65a is thereafter locked in the retracted position shown in FIG. 4, providing a tie member between frame 80 and frame 52.

Crimping means 70 may be of any suitable well known commercially available type and may be mounted either in stationary position on frame 40 or alternatively, as in the case of the present preferred embodiment, mounted for reciprocal movement on frame 40. As seen in the drawings such is secured to frame 80 for movement therewith. In the case of a stationary mounting, such would have to accommodate the reciprocal movement of closure means 50 comprising knife 51. Crimping means 70 is adapted to gather together the casing adjacent the severed end of the meat and to apply a closing means thereon and which it will be evident from the present disclosure, may provide a blind end for a further adjacent casing. Accordingly, severing of the casing to provide individual cased meats is optional. As will be appreciated from the description hereinafter, a single casing may accommodate a plurality of meat portions separated one from another by the crimpings applied. It will be appreciated, crimping and severing operations may be performed simultaneously.

A compressed air supply (not shown) is connected in a suitable well known manner to working chamber 16 for moving member 30 retractively of member 10, to discharge the meat from member 60 and also from member 30 to member 60.

The present apparatus may be constructed using known skills and suitable materials including steel and plastic.

Referring now to operation of the aforementioned apparatus. Reference is particularly made to FIGS. 5 through 12 illustrating diagrammatically the operation cycle of the apparatus. When the apparatus is used for encasing meat rather than to provide meat in a form for encasing, including as a portioner, a casing 62 is installed on member 60 via the brake mechanism (not shown), for dispensing the casing 62 in a controlled manner.

With knife 51 lowered to full cutting position to close off member 30 from member 60, meat is deposited in member 10 upon operation of stuffer 20 so as to fill member 10 with meat, as shown in FIG. 5. The meat may be of any type including ones of the sausage or solid meat kind, including that known as pork butt, ham, poultry or beef. Once member 10 is filled with meat and accordingly abutting knife 51, operation of stuffer 20 is continued and under the force of such further fed meat on the meat in member 10, member 30 moves linearly and telescopically of member 10 to thereby fill member 30 also with meat, as shown in FIG. 6. At this point, operation of stuffer 20 is stopped, knife 51 is raised to open communication between member 30 and member 60 and annular chamber 16 is filled with compressed air via suitable control means to cause member 30 to retract telescopically of member 10, as shown in FIG. 7. During this retractive movement, the meat in member 30 is deposited into member 60. Knife 51 is then lowered to fully disect the meat to create a meat portion, as shown in FIG. 8. With knife 51 in such lowered position to thereby close communication between members 30 and 60, operation of stuffer 20 is restarted to feed further meat to the meat in member 10 and under the force of such further fed meat, member 30 again moves linearly and telescopically of member 10, resulting in members 10 and 30 being filled with meat as shown in FIG. 8. Once again, operation of stuffer 20 is stopped and knife 51 raised to open communication between members 30 and 60. Annular chamber 16 is filled with compressed air as before described, to cause member 30 to retract as before described and during such retractive movement, the meat in member 60 is dispensed and deposited in casing 62. As retraction of member 30 takes place, the end of casing 62 is held firm against the end of the severed meat portion and there is controlled pay-out of the casing 62 by the brake mechanism. The brake mechanism is adapted to release the casing 62 when the capacity of the casing becomes filled. The positioning of the brake mechanism upon member 60 may be adjusted so as to be situated adjacent end 61 rather than in the position shown in the drawings i.e. adjacent closure means 50.

The severed meat portion is thus encased upon retraction of member 30 of member 10, as shown in FIG. 9. Crimping means 70 is then activated to crimp the casing 62 on the severed end of the meat portion. Knife 51 may be activated simultaneously with crimping means 70, if desired. Also if desired at this point, a further knife means may be positioned to sever the casing 62 intermediate its length after crimping, to provide an individually cased meat portion. As is known, casings are of sufficient length to accommodate a number of meat portions of given length and for this reason the apparatus is normally adapted so as not to sever the casing after the apparatus produces a first meat portion. An exception to this would be where the casing is of a length to accommodate a first meat portion dispensed.

The oscillating stroke of member 30 of member 10 basically determines the meat portion length produced and such stroke may be adjusted by suitable well known means (not shown). As indicated previously, the capacity of member 60 is adjustable volumetrically by virue of its two piece telescopic construction and is adjusted in conjunction with that of said oscillating stroke.

It will be apparent from the foregoing, operation of stuffer 20 only takes place with knife 51 in lowered position and retraction of member 30 only takes place with knife 51 in raised position.

In order to produce a "string" of encased meat, operation of the apparatus continues in similar manner as before described. With knife 51 in lowered position, stuffer 20 is again started for introducing meat under pressure to the meat in member 10 forcing telescoping movement of member 30 outwardly of member 10 and in doing so the encased meat portion is advanced along support 81, being propelled by the end 61 of member 60. FIG. 10 illustrates the position of members 10, 30 and 60 upon completion of the telescoping movement and it will be noted to be similar to that shown in FIG. 8. With operation of stuffer 20 stopped, knife 51 is then raised to permit discharge of the meat into the casing 62, which is accomplished upon retractive movement of member 30 of member 10, as shown in FIG. 11, being similar to that of FIG. 9. Such retractive movement again being accomplished as before described. Crimping of the casing 62 again takes place as before described. Thus, a further encased meat portion is created.

Operation of the apparatus continues, with the introduction of further meat under pressure from stuffer 20, as seen in FIG. 12, being similar to that of FIG. 10. Thus, the cycling operation as discussed above continues, filling the applied casing 62.

From the foregoing it will be seen the apparatus comprises back and forth oscillating movement, the oscillating of the telescoping members of the same being advanced in one direction by forces resulting from operation of the meat stuffer and advanced in the opposite direction thereto by the forces provided by the compressed air supply.

Attention is directed to FIG. 2 showing a further feature which may if desired, be incorporated into apparatus 100. Reference is made to a cushioning device for controlling the speed of movement of member 30, particularly during retraction of the same of member 10. Such is basically accomplished by providing a double acting cylinder effect, utilizing working chamber 16. This is provided by adding a further air inlet adjacent flange 19a. Thus, air may be introduced under pressure on the other side of flange 13a as well to cushion retractoral movement, the pressure being adjusted if necessary as member 30 retracts, to give a smooth and consistent movement to member 30. It is visualized other means may be employed to achieve a similar cushioning effect.

Having the ability to introduce a compressed air supply on either side of flange 13a in a controlled manner ensures controlled movement of member 30 in both directions of movement, including movement when stuffer 20 is in operation. Thus, the force of stuffer 20 may, if desired, be counter-acted.

It will also be seen from the foregoing a much improved apparatus for producing encased meat or meat in a form for encasing, has been provided, to those available in the prior art and the invention is deemed to represent a major advance in the art of encasing and portioning meats.

Although the present apparatus has been provided for use with meat products, it will be appreciated such may be used for, for example portioning or packaging other similar textured materials.

I claim:

1. An apparatus for producing encased meat or the like comprising in combination: a first elongated linear tubular member adapted to receive therein via a first end thereof, meat fed thereto under pressure; a second elongated linear tubular member mounted for reciprocal linear movement telescopically of said first member, said first member being fixedly mounted to a frame, selectively openable closure means comprising knife means adjacent the end of said second member remote from said first end, for retaining the meat received within said second member, said second member adapted to move under the force of meat fed to meat in said first member whereby to cause said second member to move outwardly in a first direction in telescoping fashion, of said first member, means for moving said second member in a second and opposite direction thereto, a third elongated linear tubular member secured for movement with said second member and adapted to receive, upon opening of said closure means, meat from said second member, said third member extending in a direction away from said second member and having an open end remote from said closure means through which the meat therein is discharged, upon telescopic movement of said second member of said first member in said second direction, said discharged meat being encased by a casing, carried on and dispensed from said third member as it moves toward said first member and crimping means for use in closing said casing on said discharged meat subsequent to severing of said discharged meat by said knife means.

2. An apparatus as defined in claim 1 wherein said first, second and third tubular members are cylindrical in shape.

3. An apparatus as defined in claim 1 wherein said knife means is secured intermediate said second and third tubular members.

4. An apparatus as defined in claim 3 including support means, whereby said knife means is supported upon at least one rail and adapted to slide therealong.

5. An apparatus as defined in claim 4, including support means, whereby the free end of said third member is supported upon said rail in spaced relation to the knife support means and adapted to slide along said rail.

6. The apparatus as defined in claim 5 including positioning means for repositioning the third member free end supporting means relative to the knife means supporting means, thereby providing access for installing said casing upon said third member.

7. An apparatus as defined in claim 1 including a support for receiving said discharged meat.

8. An apparatus as defined in claim 1 including casing dispensing means on said third member for controlling the pay-out of said casing during retractive telescopic movement of said second member of said first member and accordingly retractive movement of said third member.

9. An apparatus as defined in claim 1 wherein said crimping means is secured for reciprocal movement with said third member, relative to said first member.

10. An apparatus as defined in claim 1 wherein said means for moving said second member in said second and opposite direction comprises an annular chamber adapted to receive compressed air for use in providing the retractive telescopic movement of said second tubular member of said first tubular member.

11. An apparatus as defined in claim 1, wherein said closure means comprises a knife blade mounted for sliding movement between a first position closing off the tube end, accordingly closing said closure means and a second position opening up the tube end, accordingly opening said closure means.

12. An apparatus as defined in claim 1 wherein said meat is of the solid type including that known as pork butt, ham, poultry or beef.

13. An apparatus for producing meat or the like in a form for, for example, encasing, comprising in combination:

a first elongated linear tubular member adapted to receive therein via a first end thereof meat fed thereto under pressure, a second elongated linear tubular member mounted for reciprocal linear movement telescopically of said first member, said first member being fixedly mounted to a frame, selectively openable closure means comprising knife means, adjacent the end of said second member remote from said first end, for retaining the meat received within said second member, said second member adapted to move under the force of meat fed to meat in said first member whereby to cause said second member to move outwardly in a first direction in telescoping fashion, of said first member, means for moving said second member in a second and opposite direction thereto, a third elongated linear tubular member secured for movement with said second member and adapted to receive, upon opening of said closure means, meat from said second member, said third member extending in a direction away from said first member and having an open end remote from said closure means through which meat therein is discharged, upon telescopic movement of said second member of said first member in said second direction.

14. An apparatus as defined in claim 13 wherein said meat is of the solid type including that known as pork butt, ham, poultry or beef.

15. A method of producing encased meat or the like comprising the steps of:
(1) feeding meat to be encased under pressure to a first chamber;
(2) continuing to feed meat thereto, under pressure, whereby it applies a force to said fed meat, sufficiently to move a second chamber in a first linear direction telescopically of said first chamber, thereby substantially filling up said first and second chambers with meat;
(3) opening said second chamber to permit discharge of the meat therefrom to a third chamber;
(4) discharging said meat from said second chamber to said third chamber by moving said second chamber in a second and opposite linear direction to said first linear direction;
(5) severing the fed meat at a point intermediate said second and third chambers and reclosing said second chamber;
(6) feeding further meat to be encased under pressure to said first chamber whereby it applies a force to said fed meat, sufficiently to again move said second chamber telescopically of said first chamber, substantially filling up with meat said first and second chambers;
(7) re-opening said second chamber to permit discharge of the meat therefrom into a casing;
(8) discharging said meat from said second chamber into said casing by moving said second chamber in said second and opposite direction; and
(9) crimping said casing to close said casing over said severed and discharged meat.

16. A method as defined in claim 15 including the repetition of steps 5 to 9 inclusive.

17. A method of portioning meat comprising the steps of:
(1) feeding meat to be encased under pressure to a first chamber;
(2) continuing to feed meat thereto, under pressure, whereby it applies a force to said fed meat, sufficiently to move a second chamber in a first linear direction telescopically of said first chamber, thereby substantially filling up said first and second chambers with meat;
(3) opening said second chamber to permit discharge of the meat therefrom to a third chamber;
(4) discharging said meat from said second chamber to said third chamber by moving said second chamber in a second and opposite linear direction to said first linear direction;
(5) severing the fed meat at a point intermediate said second and third chambers and reclosing said second chamber;
(6) feeding further meat to be encased under pressure to said first chamber whereby it applies a force to said fed meat, sufficiently to again move said second chamber telescopically of said first chamber, substantially filling up with meat said first and second chambers;
(7) re-opening said second chamber to permit discharge of the meat therefrom into a casing; and
(8) discharging said portioned meat from said second chamber by moving said second chamber in said second and opposite direction.

18. A method as defined in claims 15, 16 or 17 including the step of controlling the speed of movement of said second chamber in said second and opposite direction.

19. A method as defined in claims 15, 16 or 17 including the steps of controlling the speed of movement of said second chamber in said second and opposite direction and controlling the speed of the movement of said second chamber in said first direction.

* * * * *